(12) United States Patent
Rowe (10) Patent No.: US 9,432,069 B2
(45) Date of Patent: Aug. 30, 2016

(54) AUDIO MIXING CONSOLE

(71) Applicant: Harman International Industries, Ltd., Hertfordshire (GB)

(72) Inventor: Matthew Rowe, Hertfordshire (GB)

(73) Assignee: Harman International Industries Limited, Hertfordshire (GB)

( * ) Notice: Subject to any disclaimer, the term of this patent is extended or adjusted under 35 U.S.C. 154(b) by 529 days.

(21) Appl. No.: 13/767,635

(22) Filed: Feb. 14, 2013

(65) Prior Publication Data
US 2013/0208954 A1    Aug. 15, 2013

(30) Foreign Application Priority Data

Feb. 15, 2012  (EP) .................................... 12155667

(51) Int. Cl.
*H04B 1/38* (2015.01)
*H04B 1/3827* (2015.01)
*H04H 60/04* (2008.01)

(52) U.S. Cl.
CPC ............ *H04B 1/3827* (2013.01); *H04H 60/04* (2013.01)

(58) Field of Classification Search
CPC .............................. H04B 1/3827; H04H 60/04
USPC ................ 84/644; 108/15; 324/319, 756.06; 343/702; 370/241; 379/127.01; 381/56, 381/74, 107, 119, 311, 323; 382/119; 455/3.05, 11.1, 73, 515, 569.1; 463/35, 463/46; 704/260, 275; 710/74; 715/716; 235/439

See application file for complete search history.

(56) References Cited

U.S. PATENT DOCUMENTS

| | | | | |
|---|---|---|---|---|
| 5,396,398 A | * | 3/1995 | Gill ........................ | F16M 13/00 108/119 |
| 5,537,040 A | * | 7/1996 | Ehnholm ...................... | 324/319 |
| 5,563,952 A | * | 10/1996 | Mercer ........................... | 381/56 |
| 5,906,035 A | * | 5/1999 | Atkins ................... | A47B 81/06 108/12 |

(Continued)

FOREIGN PATENT DOCUMENTS

| | | |
|---|---|---|
| EP | 1 748 568 A2 | 1/2007 |
| EP | 1 748 568 A3 | 11/2007 |

OTHER PUBLICATIONS

European Search Report dated Jul. 10, 2012, EP 12155667.4-2223, 8 pgs.

*Primary Examiner* — Gerald Gauthier
(74) *Attorney, Agent, or Firm* — Brooks Kushman P.C.

(57) ABSTRACT

An audio mixing console can process at least one audio signal. The audio mixing console includes a main housing with a plurality of outer surfaces. The audio mixing console also includes a wireless transceiver provided substantially outside the main housing and an interface connected to the wireless transceiver. The audio mixing console further includes a radio-frequency permeable housing detachably coupled to a second outer surface of the main housing, wherein the wireless transceiver is positioned within the radio-frequency permeable housing.

15 Claims, 6 Drawing Sheets

(56) References Cited

U.S. PATENT DOCUMENTS

| | | | |
|---|---|---|---|
| 6,353,169 B1 | 3/2002 | Juszkiewicz et al. | |
| 7,391,874 B1* | 6/2008 | Semmes, Jr. | H04N 5/268 348/333.01 |
| 7,660,428 B2* | 2/2010 | Rodman | H04R 1/025 381/355 |
| 7,698,009 B2* | 4/2010 | Cotey | G06F 3/165 381/119 |
| 7,699,224 B2* | 4/2010 | Mole | 235/439 |
| 8,175,542 B2* | 5/2012 | Nandagopalan et al. | 455/73 |
| 8,178,771 B2* | 5/2012 | Ando | 84/644 |
| 8,264,412 B2* | 9/2012 | Ayala et al. | 343/702 |
| 8,300,853 B2* | 10/2012 | Aiso | H05B 33/0863 315/279 |
| 8,321,228 B2* | 11/2012 | Chipchase et al. | 704/275 |
| 8,331,544 B2* | 12/2012 | Kraus et al. | 379/127.01 |
| 8,432,322 B2* | 4/2013 | Amm et al. | 343/702 |
| 8,491,386 B2* | 7/2013 | Reiss et al. | 463/35 |
| 8,504,115 B2* | 8/2013 | Junge et al. | 455/569.1 |
| 8,529,356 B2* | 9/2013 | Soelberg et al. | 463/46 |
| 8,538,054 B2* | 9/2013 | Cooper et al. | 381/323 |
| 8,587,335 B2* | 11/2013 | Gregg et al. | 324/756.06 |
| 8,660,515 B2* | 2/2014 | Malachowsky | H04H 20/72 455/333 |
| 8,675,894 B2* | 3/2014 | Ayres | 381/107 |
| 8,800,455 B2* | 8/2014 | Monroe | 108/15 |
| 8,868,429 B2* | 10/2014 | Sun et al. | 704/275 |
| 2003/0160862 A1* | 8/2003 | Charlier | H04N 5/23238 348/14.08 |
| 2004/0030425 A1 | 2/2004 | Yeakel et al. | |
| 2004/0039463 A1* | 2/2004 | Sucher | H04H 60/04 700/94 |
| 2004/0219924 A1* | 11/2004 | Flynn | H01Q 1/44 455/446 |
| 2005/0281423 A1* | 12/2005 | Armstrong et al. | 381/311 |
| 2005/0286213 A1* | 12/2005 | Rooney | G06F 3/021 361/679.02 |
| 2009/0094395 A1* | 4/2009 | Shen | 710/74 |
| 2010/0128888 A1* | 5/2010 | Junge et al. | 381/74 |
| 2011/0066941 A1* | 3/2011 | Chipchase et al. | 715/716 |
| 2011/0161085 A1* | 6/2011 | Boda et al. | 704/260 |
| 2012/0264473 A1* | 10/2012 | Mujtaba et al. | 455/515 |
| 2012/0287792 A1* | 11/2012 | Nickel et al. | 370/241 |
| 2012/0299785 A1* | 11/2012 | Bevelacqua | 343/702 |
| 2013/0090054 A1* | 4/2013 | Bair | 455/3.05 |
| 2013/0122803 A1* | 5/2013 | Forster | 455/11.1 |
| 2013/0208954 A1* | 8/2013 | Rowe | H04B 1/3827 382/119 |
| 2013/0236033 A1* | 9/2013 | Ayres | H04H 60/04 381/119 |

* cited by examiner

AUDIO MIXING CONSOLE

PRIORITY CLAIM

This application claims the benefit of priority from European Patent Application No. EP12 155 667.4, filed Feb. 15, 2012, which is incorporated by reference.

TECHNICAL FIELD

The invention relates to an audio mixing console, and more specifically to an audio mixing counsel that includes a main housing and a wireless transceiver.

RELATED ART

Audio mixing consoles are widely employed for processing of audio signals of different kinds and numbers. For example, a number of input audio signals may be processed, i.e., amplified or mixed or enhanced with certain audio effects, and then output as audio output signal to one or more consuming units, such as loudspeakers or headphones or recording means. Environments where such audio mixing consoles find application include, but are not limited to: on-stage performances, presentations, places of worship, theater, trade fares, etc. Often, in such situations it is desired to provide wireless transmission to and from certain remote units. Examples for scenarios where wireless transmission is desired include the provisioning of microphones.

SUMMARY

An audio mixing console for processing audio signals can include a main housing with a plurality of outer surfaces and a plurality of operating elements being provided on a first one of the outer surfaces to control the processing of at least some of the audio signals. Furthermore, the audio mixing console can include a wireless transceiver provided substantially outside the main housing and configured for establishing wireless transmission of a first audio signal included among audio signals. Furthermore, the audio mixing console can include an interface connected to the wireless transceiver and provided on one of the outer surfaces. The interface may be configured for data forwarding of the first audio signal to and from the wireless transceiver. In addition, the audio mixing console can include a radio-frequency permeable housing detachably attached to a second one of the outer surfaces. The wireless transceiver may be positioned within the radio-frequency permeable housing.

For example, the wireless transmission may be in the form of a radio link allowing sending data to a remote unit, and receiving data from the remote unit. The data may correspond to the first audio signal, such as in a packetized form that includes, for example, error correction and header data. Different audio signals may relate to input and output audio signals. For example, such input and output audio signals may be received or output through certain connectors. These connectors may be connected to external units, such as audio sources or loudspeakers. Inside the audio mixing console's main housing, a sound processor or a number of sound processors may be provided in order to process the audio signals by amplifying, mixing, or enhancing with certain audio effects, such as echoes or delays, etc. Also, the interface connected to the wireless transceiver may input and/or output audio data to and from such a sound processor.

By providing the wireless transceiver within the radio-frequency permeable housing substantially outside the main housing of the audio mixing console, it may be possible to obtain an audio mixing console which is easy and safe to handle. In particular, the wireless transceiver housed within the radio-frequency permeable housing may not be accidentally detached because it may be provided such that it is not accessible from the outside without removing the housing. At the same time, by providing the wireless transceiver substantially outside the main housing, an increased wireless transmission reliability of the respective wireless transmission may be obtained. For example, the interface may be provided on the second outer surface, as well. However, it may also be possible that the interface is provided on another one of the outer surfaces, preferably on one of the outer surfaces being adjacent to the second outer surface.

Furthermore, the wireless transceiver may extend in a vertical direction beyond a plane defined by the first outer surface. The first outer surface may correspond to the outer surface on which the operating elements are provided. Typically, such an outer surface may substantially point in the vertical direction such that the operating elements are easily accessible by a user. Providing the wireless transceiver such that it extends in a vertical direction beyond the plane defined by the first outer surface, such as in a substantially horizontal plane, may result in particularly increased radio transmission reliability.

The radio-frequency permeable housing may substantially cover the second outer surface. If the second outer surface is substantially covered by the housing, an audio mixing console may be obtained which is resistant to fluid spill, shock, vibration, or other external stress. In particular, the radio-frequency permeable housing may protrude from a plane defined by the first outer surface. A portion of the radio-frequency permeable housing where the wireless transceiver is housed may protrude from the plane defined by the first outer surface. For example, the edges of the housing and the housing body may be substantially flush with the edges of the second outer surface. In this way, a compact and robust audio mixing console may be obtained.

The wireless transceiver may be positioned inside the radio-frequency permeable housing offset from the second outer surface. If the wireless transceiver is positioned offset and away from the second outer surface, particularly good radio-frequency wave propagation may be obtained. As an effect, the wireless transmission reliability may be increased.

To this respect, the radio-frequency permeable housing may be substantially made out of plastic material and/or the outer surfaces of the main housing may be made out of metal. A plastic material may have the effect of providing only a small resistance to radio-frequency wave propagation, i.e., low damping. This may allow for increased wireless transmission reliability because the wireless transceiver is housed within the radio-frequency permeable housing made out of a plastic material. At the same time, increased stability and robustness of the main housing of the audio mixing console may be obtained when the outer surfaces are substantially made of metal.

The wireless transceiver may be detachably coupled to the radio-frequency permeable housing. Accordingly, the wireless transceiver is removable if not needed. For example, there may exist certain situations, where no wireless transmission is needed. Then it may be possible to remove the wireless transceiver by first removing the housing, then removing the transceiver, and then putting the housing back into place.

The wireless transceiver may include an antenna which extends in a vertical direction beyond a plane defined by the first outer surface. For example, the wireless transceiver may include a number of different units, such as a processing unit, and interfaces, and memory devices in addition to the antenna. Such devices may typically be necessary in order to establish a wireless connection. If the antenna is positioned such that it extends in a vertical direction beyond the plane defined by the first outer surface, it may be possible to obtain a radio-frequency permeable housing which has edges that are substantially flush with the edges of the respective second outer surface. In this scenario, substantially the entirety of the second outer surface may be covered, while only in a relatively small region where the antenna is positioned the radio-frequency permeable housing may protrude from the edges of the second outer surface. For example, the radio-frequency permeable housing may project from the edges of the second outer surface.

The wireless transceiver may be configured to establish wireless transmission with any of a number of different audio related devices, such as a microphone, headphones, a loudspeaker, an amplifier, a portable music device, or any other audio signal source. Such devices typically may be connected via a wireless radio link with effects as described above. The wireless transceiver may include hardware and software for establishing such a wireless transmission radio link The main housing of the console may be formed to have a tapered vertical extension by having a low front outer surface and a relatively high back outer surface and two tapered side outer surfaces. Such a console may have a cross-section of the main housing substantially formed in a wedge shape. The user may face the low front outer surface and handle the operating elements being provided on the first outer surface, which may be a top surface. A first plane defined by the first outer surface, such as the top surface, may have a second plane normal to it, which encloses a small angle, such as less than 30°, or less than 15° with the vertical direction.

The second outer surface may be a side surface of the main housing. This means that the wireless transceiver positioned and housed within the radio-frequency permeable housing may be arranged offset from the side surface of the main housing.

The wireless transceiver may be positioned closer to a back outer surface than to a front outer surface of the main housing. For example, the wireless transceiver may be disposed inside the radio-frequency permeable housing, which is detachably attached to the second outer surface, which may be a side surface. The effect of optimized wireless transmission reliability may be achieved by positioning the wireless transceiver closer to the back outer surface of the console, such as facing the remote units.

The audio mixing console may further include a second wireless transceiver provided substantially outside the main housing. The second wireless transceiver may be for establishing wireless transmission of a second audio signal. The audio mixing console may further include a second interface connected to the second wireless transceiver and provided on one of the outer surfaces of the console. The second interface may be configured for data forwarding of the second audio signal. The audio mixing console may further include a second radio-frequency permeable housing detachably attached to a third one of the outer surfaces of the console. The second wireless transceiver can be positioned within the second radio-frequency permeable housing. The third outer surface can be on a side of the main housing opposite the second outer surface. For example, the second outer surface may be a right hand side outer surface as seen from the user of the audio mixing console, while the third outer surface may be a left hand side outer surface as seen from the user of the audio mixing console.

The first and the second wireless transceivers may establish wireless transmission with two different audio-related devices, such as a microphone, headphones, a loudspeaker, an amplifier, a portable music device, or an audio signal source. By establishing wireless transmission with different audio-related devices using the first and the second wireless transceivers, wireless transmission reliability may be optimized. For example, the first and the second wireless transceivers may use different radio link channels corresponding to, for example, two different radio frequencies. In this example, the wireless transmission of the first and second wireless transceivers may not inhibit each other significantly.

The second interface may be provided on the third outer surface, as previously discussed. In other examples, however, the second interface may be provided on a different outer surface, preferably on a surface that is adjacent to the third outer surface.

In an example configuration, the first wireless transceiver may be configured to output an output audio signal to headphones and the second wireless transceiver may be configured to input an input audio signal from a microphone. In this example, the audio mixing console may be configured to process the input audio signal obtained from the microphone and then to output the processed input audio signal as the output audio signal to the headphones. It may also be possible, however, for the audio mixing console to process the audio input signal obtained from the microphone, but output a different audio output signal to the headphones. There exist numerous possibilities of configurations between audio input signal and audio output signal.

Although the invention has been described with respect to certain preferred embodiments, equivalents, combinations, and modifications will occur to others skilled in the art upon the reading and understanding of the specification. The present invention includes all such equivalents, combinations, and modifications and is limited only by the scope of the appended claims.

BRIEF DESCRIPTION OF THE DRAWINGS

The foregoing and other features of embodiments will become more apparent from the following detailed description of the embodiments when read in conjunction with the accompanying drawings. In the drawing, like reference numerals referenced like elements.

DETAILED DESCRIPTION

The drawings are to be regarded as being schematic representations of embodiments, and elements illustrated in the drawings are not necessarily shown to scale. Rather, the various elements are represented such that their function and general purpose become apparent to a person skilled in the art.

Figure 1:
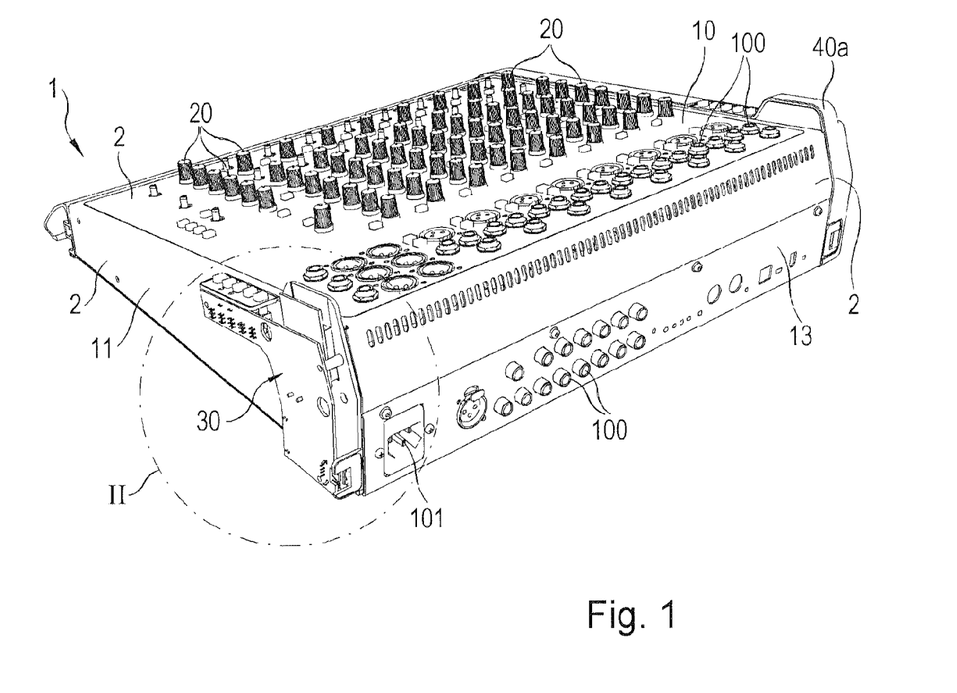
FIG. 1 is a perspective view of an example of an audio mixing console.

FIG. 1 is a perspective view of an example of an audio mixing console 1 comprising a main housing 2. The main housing 2 of the audio mixing console 1 has six outer surfaces 10, 11, 12, 13, 14, 15. In FIG. 1 the outer surfaces 10, 11, and 13 are visible. On a first one of these outer surfaces, a top surface 10, a plurality of operating elements 20 are arranged. The operating elements 20 allow control of processing of audio signals. Processing can refer to, for example, mixing, amplifying of an audio signal, or enhancing the audio signal with certain audio effects, such as echo or delay. Also, a number of audio input and output connectors 100 are provided on the top surface 10. These connectors 100 are adapted to input and/or output audio signals as input audio signals and output audio signals, respectively. Also, a power connector 101 is provided on the back outer surface 13. Also, further audio connectors 100 may be provided on back outer surface 13.

The audio mixing console 1 of FIG. 1 is shown in a state where a radio-frequency permeable housing 40 (not visible in FIG. 1) is detached from the second outer surface 11. Because the radio-frequency permeable housing 40 is removed, a wireless transceiver 30 is visible. The wireless transceiver 30 is arranged close to the back outer surface 13 on the second outer surface 11, which may be described as a right hand side outer surface 11. If the radio-frequency permeable housing 40 were to be illustrated in FIG. 1 as attached to the audio mixing console 1, the wireless transceiver 30 would be housed within the housing 40. Details of the wireless transceiver 30 will be discussed hereinafter with respect to FIG. 2.

A second radio-frequency permeable housing 40a is visible in FIG. 1. This second radio-frequency permeable housing 40a is detachably attached to a third outer surface 14 which may be described as a left hand side outer surface of the main housing 2 of the audio mixing console 1. The third outer surface 14 is hidden in the perspective view of FIG. 1.

Figure 2:
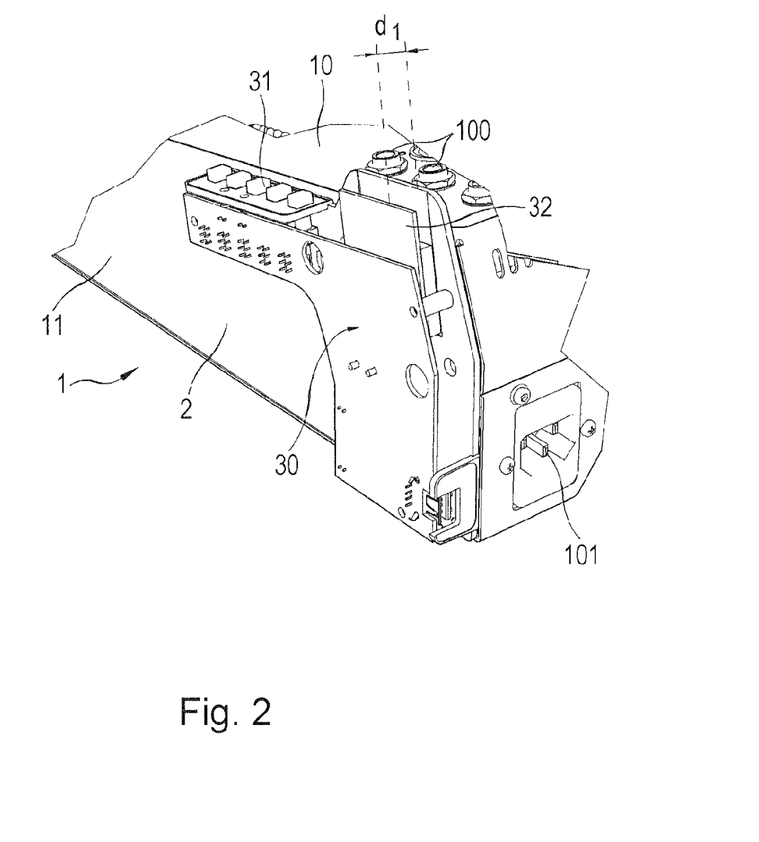
FIG. 2 is an enlarged detail view of a portion of the perspective view of FIG. 1.

Next, with respect to FIG. 2, details of an example of the wireless transceiver 30 are discussed. FIG. 2 is an enlarged view of the region labeled II in FIG. 1. As can be seen, the wireless transceiver 30 includes an antenna 32. The antenna 32 is positioned offset by a predetermined distance d1 from the second outer surface 11. Because the second outer surface 11 is made of metal, positioning the antenna 32 offset from this metal surface can have the effect of increasing wireless transmission reliability. Also, the antenna 32 longitudinally extends to protrude from a substantially transverse plane defined by the top surface 10. In other words, the antenna 32 projects in a direction substantially perpendicular to the plane defined by the top surface 10 to a predetermined height above the plane defined by the top surface. The positioning of the antenna, with respect to the side surface 11 and the top surface 10 of the audio mixing board 1 can have the effect of increased wireless transmission reliability.

Also shown in FIG. 2 is an interface 31. The interface 31 is connected to the wireless transceiver 30 and is configured for data forwarding of a first audio signal to and from the wireless transceiver 30. For example, the interface 31 can be connected to an audio signal processor within the audio mixing console 1, or an audio processing board, or an audio signaling bus, or the like. The interface 31 can be configured to send data to the wireless transceiver 30 for sending this data via the wireless radio link established by the transceiver 30. Also, the interface 31 can be configured to send data from the wireless transceiver 30 towards other units of the audio mixing console as describe elsewhere. Generally, the interface 31 can forward data to and from the wireless transceiver 30 depending on the application. Thus, the interface 31 can be configured to handle input audio signals and/or output audio signals.

In particular, the wireless transceiver 30 can establish a bi-directional wireless transmission to and from a remote unit. Such remote audio-related devices (not shown in FIGS. 1-6) can include but are not limited to: a microphone, headphones, a loudspeaker, an amplifier, a portable music device, or an audio signal source. Depending on the particular type of such a remote audio-related device, the wireless transmission between the wireless transceiver and the remote audio-related device can relate to either an input audio signal input into the audio mixing console, or an output audio signal output from the audio mixing console. For example, the connection to headphones may be in form of an output audio signal while the connection from a microphone may be in the form of an input audio signal. The type of connection may vary as the tasks vary.

The audio signals may be in the form of packetized data. For example, each packet may include error correction and header data allowing increased wireless transmission reliability. Any data protocols for wireless transmission of audio signals may be used. In addition, in other examples, wireless transmission using the wireless transceiver 30 is not limited to only audio signals such that other data can be received and transmitted using the wireless transceiver 30. For example, the data may relate to remote control of the audio mixing console 1, or remote control of remote audio-related devices. Because the content of the packetized data is flexible, the type of application for which the wireless transmission is employed is not limited.

Figure 3:
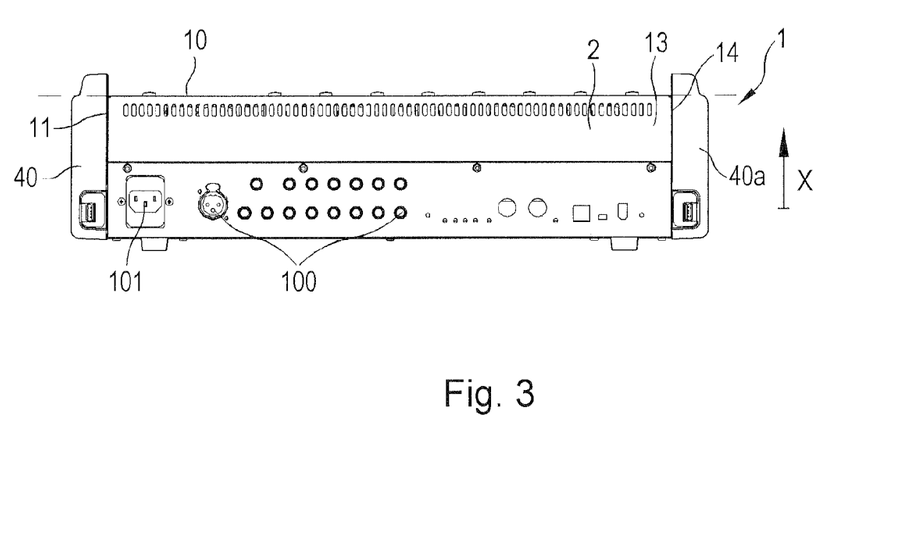
FIG. 3 is a back view of the audio mixing console of FIG. 1.

FIG. 3 is a back view of the audio mixing console 1. In FIG. 3, the radio-frequency permeable housing 40 is illustrated as attached to the second outer surface 11. In FIG. 3, the location of the radio-frequency permeable housing 40 may be described as the right hand side outer surface of the audio mixing console 1 (appearing at the left side of the audio mixing console 10 in FIG. 3, since FIG. 3 is a back view). Also, in FIG. 3, the second radio-frequency permeable housing 40a is again illustrated as attached to the third outer surface 14, which may be described as the left hand side outer surface of the audio mixing console 10. In FIG. 3, the vertical direction is labeled X. As can be seen, the radio-frequency permeable housings 40, 40a extend in the vertical direction X beyond a plane defined by the top surface 10. This plane is indicated in FIG. 3 by a dashed-dotted line. The radio-frequency permeable housings 40, 40a extend above the plane defined by the top surface 10 in order to allow the antenna 32 (FIG. 2) of each of the wireless transceivers 30 to extend in the vertical direction X beyond said plane. Other than the portion of the radio-frequency permeable housings 40, 40a positioned between the antenna 32 and the audio mixing console 1, the edges of the housings 40, 40a are substantially flush with the edges of the respective outer surfaces 11, and 13 of the main housing 2, as illustrated in FIG. 2. This can also be seen from FIG. 4, which illustrates an example of a top view of the mixing console 1.

Figure 4:
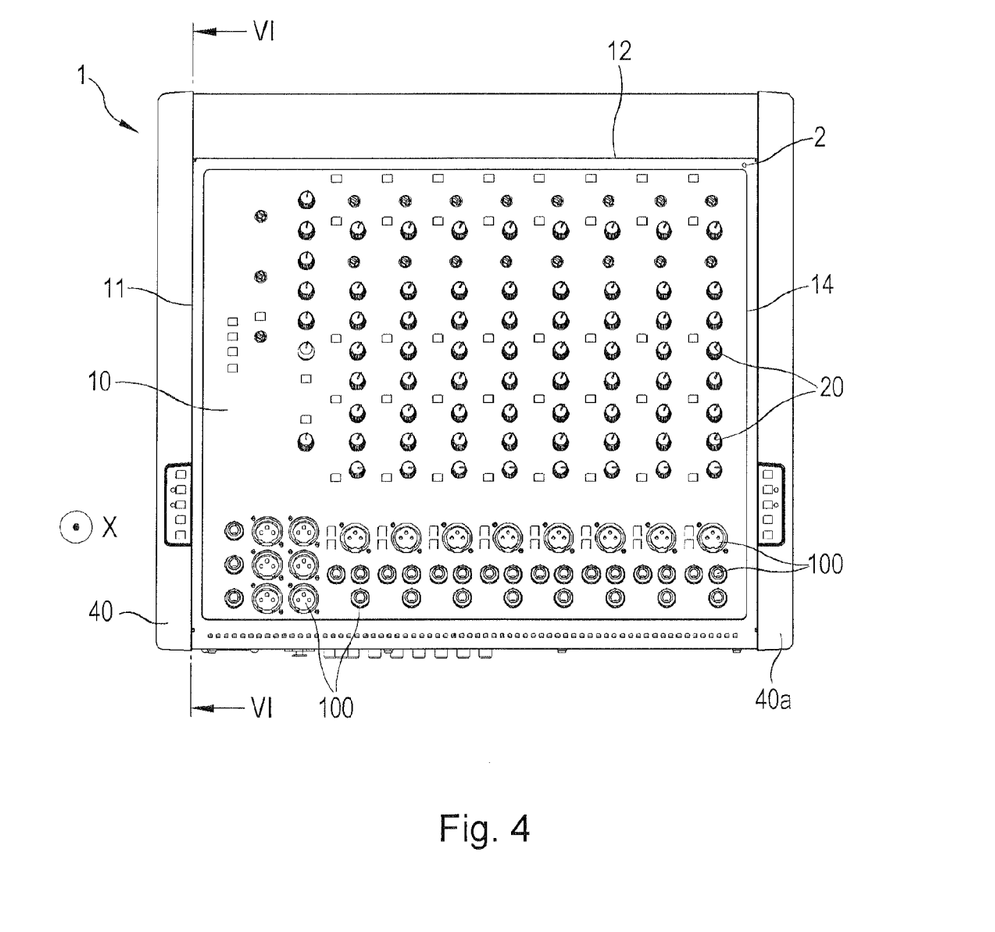
FIG. 4 is a top view of the audio mixing console of FIG. 1.

In the example of FIG. 4, the radio-frequency permeable housings 40, 40a extend to respectively cover the second outer surface 11 and the third outer surface 14, which may also be described as the left hand side and right hand side outer surfaces 11, and 14. In FIG. 4, the entire length of the right hand side and left hand side outer surfaces 11, and 14 are covered by the respective radio-frequency permeable housings 40, 40a, which can make the audio mixing console 1 easy and safe to handle. For example, the housings 40, and 40a can be made of a plastic material while the main housing 2 can be made of metal. By making the main housing 2 of metal, a very robust and shock resistant audio mixing console 1 can be achieved. At the same time, because the housings 40, and 40a are made out of a plastic material, good wireless transmission reliability of the radio link established by the wireless transceiver 30 can be obtained. The wireless transceiver 30 (not shown in FIG. 4) is housed in housing 40, which is made out of plastic or some other material that does not inhibit radio wave transmission. Since the material of the housing 40, such as plastic, does not significantly inhibit radio-frequency wave propagation, significantly higher wireless transmission reliability of receipt and transmission through the housing 40 can be achieved in comparison to an antenna in, for example, a housing form of metal.

The second wireless transceiver 30a housed within the second housing 40a can be configured similarly to the wireless transceiver 30 housed within the housing 40 with respect to structural, as well as operational features. For example, the positioning of the wireless transceivers 30, and 30a can be symmetrical with respect to the right hand side and left hand side outer surfaces 11, and 14. Also, the second wireless transceiver 30a can, for example, extend in the vertical direction X beyond the plane defined by the top surface 10 of the main housing 2. It is also possible that during operation the wireless transceivers 30, and 30a employ the same data protocols, but can communicate with different remote audio-related devices. For example the wireless transceiver 30 may communicate with headphones, while wireless transceiver 30a communicates with one or more microphones or other audio sources. In other words, wireless transceiver 30 may output an output audio signal while wireless transceiver 30a may input an input audio signal, or vice-versa.

Also, the housing 40a can be likewise configured as the housing 40. The housing 40a covers substantially the entire third outer surface 14, which can be described as the left hand side outer surface of the main housing 2. Also, a portion of the housing 40a positioned substantially adjacent the second wireless transceiver 30a protrudes above the third outer surface 14. Also, the second radio-frequency permeable housing 40a may be made of a plastic material, or any other material that does not impede communication of wireless signals.

Figure 5:
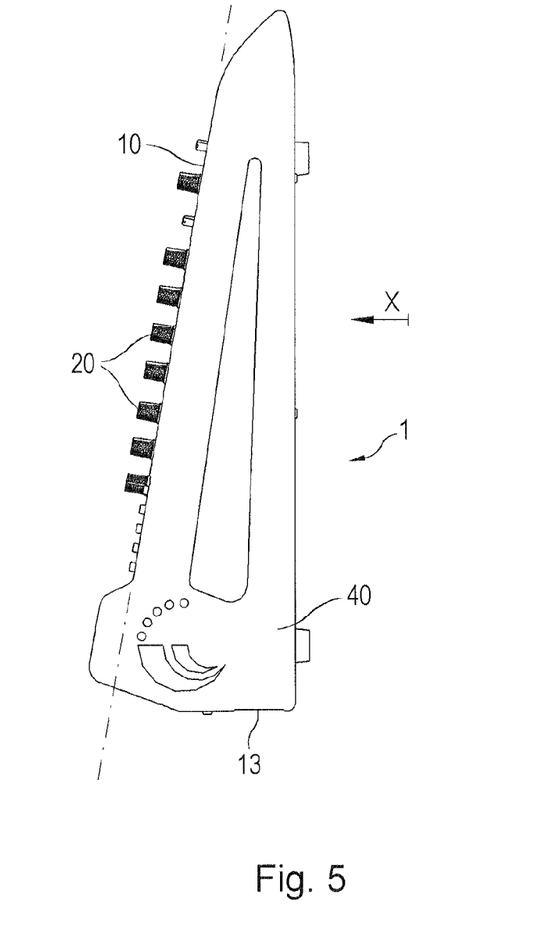
FIG. 5 is a side view of the audio mixing console of FIG. 1.
Figure 6:
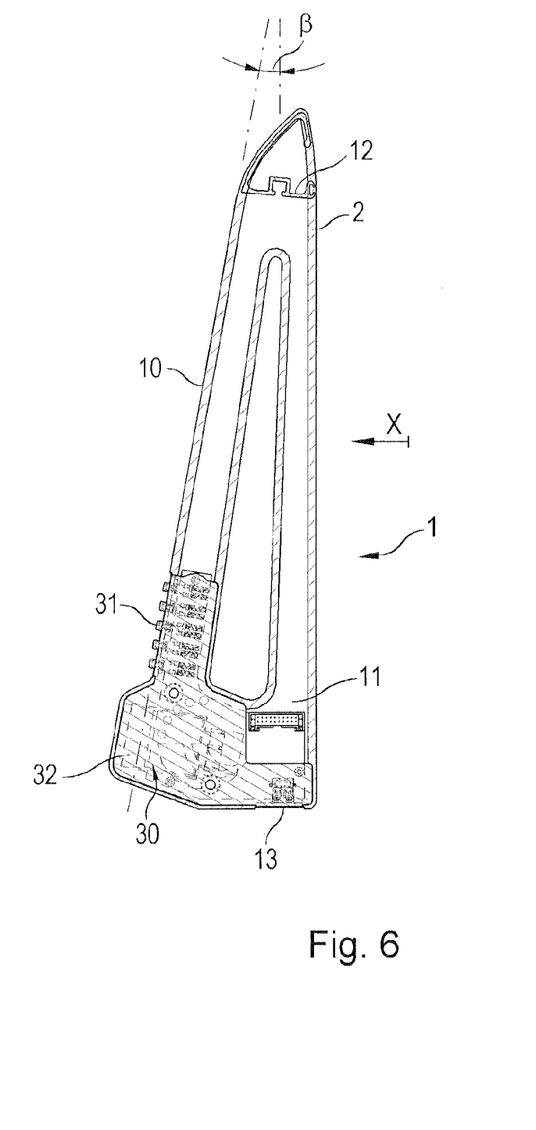
FIG. 6 is a cross-sectional side view of the audio mixing console of FIG. 1.

In FIG. 5, an example of a side view of the audio mixing console 1 is shown. As can be seen, the radio-frequency permeable housing 40 protrudes from the plane defined by the top surface 10 (indicated by a dashed-dotted line in FIGS. 5 and 6) only in a portion of the radio-frequency permeable housing 40 that is substantially close to the back surface 13 where the wireless transceiver 30 is housed. The wireless transceiver 30 is not visible in FIG. 5, however, the wireless transceiver 30 is visible in the example of FIG. 6. FIG. 6 is a cross-sectional view along the line labeled VI-VI in FIG. 4. This line is coincident with the second outer surface 11 of the main housing 2, which may be described as the right hand side outer surface. In FIG. 6, the wireless transceiver 30 is visible, along with the antenna 32 and the interface 31. As can be seen from FIG. 6, the antenna 32 extends beyond the plane defined by the top surface 10 (indicated by a dashed-dotted line in FIG. 6) in the vertical direction X. The orientation of the top surface 10 is such that the plane defined by the top surface 10 encloses a small angle of approximately 10° with the horizontal direction. This is indicated in FIG. 6 by the angle β. From FIG. 6 it is furthermore visible that the vertical extensions of the main housing 2 increase from the front of the main housing 2 (in FIG. 6 depicted in the upper part) towards the back of the main housing 2 (in FIG. 6 depicted in the lower part), such as from the front surface 12 towards the back surface 13. Therefore, the cross-section of the main housing 2 has a wedge shape or, in other words, the main housing 2 has a tapered vertical extension and has a relatively low front outer surface 12 and a relatively high back outer surface 13 and the two tapered side outer surfaces 11, 14. The wireless transceiver 30 is positioned at a position closer to the back outer surface 13 than to the front outer surface 12 inside the radio-frequency permeable housing 40.

While devices according to examples have been described in the details herein, modifications may be implemented in other embodiments. For example, it is possible that the main housing 2 of the audio mixing console 1 has a different shape. It is also possible to provide the wireless transceivers at different outer surfaces, e.g. the front or the back surface inside the respective permeable housings. It is also possible to provide only a single wireless transceiver instead of two wireless transceivers.

I claim:

1. An audio mixing console for processing of at least one audio signal, comprising:
   a main housing having a plurality of outer surfaces, including a first outer surface and a second outer surface,
   a plurality of operating elements being disposed on the first outer surface, the operating elements configured to control processing of the at least one audio signal,
   a wireless transceiver extending away from the main housing and configured to establish wireless transmission of a first audio signal of the at least one audio signal,
   an interface connected to the wireless transceiver and provided on one of the outer surfaces, the interface configured to forward the first audio signal to and from the wireless transceiver, and
   a radio-frequency permeable housing detachably coupled to the second outer surface, wherein the wireless transceiver is positioned within the radio-frequency permeable housing,
   where the wireless transceiver extends in a vertical direction (X) beyond a plane defined by the first outer surface.

2. The audio mixing console of claim 1, where the radio-frequency permeable housing substantially covers the second outer surface.

3. The audio mixing console of claim 1, where a portion of the radio-frequency permeable housing protrudes beyond a plane defined by the first outer surface, the portion being proximate to where the wireless transceiver is housed.

4. The audio mixing console of claim 1, where the wireless transceiver is positioned inside the radio-frequency permeable housing offset from the second outer surface.

5. The audio mixing console of claim 1, where the radio-frequency permeable housing is substantially made out of a plastic material, and where the outer surfaces of the main housing are substantially made out of metal.

6. The audio mixing console of claim 1, where the wireless transceiver is detachably coupled with the radio-frequency permeable housing.

7. The audio mixing console of claim 1, where the wireless transceiver comprises an antenna which extends in the vertical direction (X) beyond the plane defined by the first outer surface.

8. The audio mixing console of claim 1, where the wireless transceiver is configured to establish wireless communication using the wireless transmission with audio-related devices selected from the group consisting of: a microphone, headphones, a loudspeaker, an amplifier, a portable music device, or an audio signal source.

9. The audio mixing console of claim 1, where the first one of the surfaces forms a planar surface of the main housing having a tapered vertical extension, a periphery of the planar surface coupled between first peripheral edges of a front outer surface, a back outer surface and two side outer surfaces formed as surrounding surfaces of the main housing and having second peripheral edges opposite the first peripheral edges that are lie in a single plane, a distance between the first and second peripheral edges of the front outer surface being less than the first and second peripheral edges of the back outer surface to create the tapered vertical extension of the planar surface, and the first peripheral edges of the two side outer surfaces being correspondingly tapered.

10. The audio mixing console of claim 1, where the second outer surface is a side surface of the main housing.

11. The audio mixing console of claim 10, where the wireless transceiver is positioned closer to a back outer surface of the main housing than to a front outer surface of the main housing, and the wireless transceiver disposed inside the radio-frequency permeable housing is detachably coupled with the side surface.

12. The audio mixing console of claim 1, further comprising:
a second wireless transceiver provided substantially outside the main housing and configured to establish wireless transmission of a second audio signal of the at least one audio signal,
a second interface connected to the second wireless transceiver and provided on one of the outer surfaces, the second outer surface configured to provide data forwarding of the second audio signal, and
a second radio-frequency permeable housing detachably attached to a third outer surface included among the surfaces, where the second wireless transceiver is positioned within the second radio-frequency permeable housing and wherein the third outer surface is on a side of the main housing opposing the second outer surface.

13. The audio mixing console of claim 12, where the wireless transceiver and the second wireless transceiver establish wireless transmission with two different audio-related devices selected from the group consisting of: a microphone, headphones, a loudspeaker, an amplifier, a portable music device, an audio signal source.

14. The audio mixing console of claim 13, wherein the wireless transceiver is configured to output an output audio signal to headphones and wherein the second wireless transceiver is configured to input an input audio signal from the microphone.

15. An audio mixing console for processing of at least one audio signal, comprising:
a main housing having a plurality of outer surfaces, including a first outer surface and a second outer surface,
a plurality of operating elements being disposed on the first outer surface, the operating elements configured to control processing of the at least one audio signal,
a wireless transceiver extending away from the main housing and configured to establish wireless transmission of a first audio signal of the at least one audio signal,
an interface connected to the wireless transceiver and provided on one of the outer surfaces, the interface configured to forward the first audio signal to and from the wireless transceiver, and
a radio-frequency permeable housing detachably coupled to the second outer surface, wherein the wireless transceiver is positioned within the radio-frequency permeable housing,
where the wireless transceiver comprises an antenna which extends in a vertical direction (X) beyond a plane defined by the first outer surface.

* * * * *